United States Patent
Shankar et al.

(10) Patent No.: US 8,484,510 B2
(45) Date of Patent: Jul. 9, 2013

(54) ENHANCED CLUSTER FAILOVER MANAGEMENT

(75) Inventors: Indumathi Shankar, Los Altos, CA (US); Avanish Mishra, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 24 days.

(21) Appl. No.: 12/638,663

(22) Filed: Dec. 15, 2009

(65) Prior Publication Data

US 2011/0145631 A1    Jun. 16, 2011

(51) Int. Cl.
*G06F 11/00* (2006.01)
*G06F 11/20* (2006.01)

(52) U.S. Cl.
USPC .............................. 714/13; 714/15; 714/47.1

(58) Field of Classification Search
USPC .................. 714/6.31, 13, 15, 47.1, 47.2, 47.3
See application file for complete search history.

(56) References Cited

U.S. PATENT DOCUMENTS

| | | | | |
|---|---|---|---|---|
| 6,738,811 B1 * | 5/2004 | Liang | ............................. | 709/224 |
| 6,941,490 B2 * | 9/2005 | Ohran | ............................. | 714/15 |
| 7,796,039 B2 * | 9/2010 | Brillhart et al. | ............. | 340/572.1 |
| 7,844,686 B1 * | 11/2010 | Keith, Jr. | ........................ | 709/219 |
| 7,890,792 B2 * | 2/2011 | Tameshige et al. | ............... | 714/3 |
| 8,140,652 B2 * | 3/2012 | Calo et al. | ...................... | 709/221 |
| 8,171,325 B2 * | 5/2012 | Brillhart et al. | ............... | 713/324 |
| 8,201,028 B2 * | 6/2012 | Sawczak et al. | ............. | 714/47.1 |
| 2004/0255189 A1 * | 12/2004 | Chu et al. | ......................... | 714/13 |
| 2008/0126886 A1 * | 5/2008 | Elliott et al. | ..................... | 714/57 |
| 2009/0265510 A1 * | 10/2009 | Walther et al. | ................ | 711/114 |
| 2010/0138679 A1 * | 6/2010 | Yoshida | ......................... | 713/321 |

OTHER PUBLICATIONS

Faq by Speedguide.net http://www.speedguide.net/faq_in_q.php?qid=241 version from Feb. 5, 2007, found via the WayBack Machine.*

* cited by examiner

*Primary Examiner* — Joseph Schell
(74) *Attorney, Agent, or Firm* — Wilmer Cutler Pickering Hale and Dorr LLP (57) ABSTRACT

An embodiment of the present invention is directed to a method and system for making intelligent failover decisions within a server cluster. The method includes receiving temperature information and location information using RFID technology and detecting an error condition. The method further includes responsive to the error condition, selecting a failover target based on said temperature information and location information and transferring operations from a portion of a storage cluster to the failover target based on the selecting.

30 Claims, 10 Drawing Sheets

| Object | Attribute | Attribute Val |
|---|---|---|
| Server | RFIDTag ← 704 | Type = Val, Zone = Val, Rack = Val, Temp = Val |
| | DepStorage ← 708 | Name = "Array Name", Dep = "Local/Remote", Type = Val, Zone = Val, Rack = Val, Temp = Val |

↑ 706 above Attribute Val column; ↑ 710 above second Attribute Val entry; 702 points to Object column; 700

ENHANCED CLUSTER FAILOVER MANAGEMENT

TECHNICAL FIELD

Embodiments of the present invention generally relate to digital computer systems.

BACKGROUND

As technology advances, data storage is increasingly important and the amounts of data storage is increasing rapidly. Correspondingly, the size of data storage arrays and their demands for storage have increased rapidly. Ever increasing amounts of data are required to be highly available and protected from corruption or damage caused by any of a variety of factors, such as natural disasters and power failures. As a result, increasingly complex data storage clusters are used to satisfy the demands for data storage and retrieval.

Server clusters often include multiple nodes or servers communicating in a peer to peer fashion to provide access to multiple data storage arrays. The multiple nodes allow requests to be spread over the nodes to provide high availability as well as supporting failover of functionality to other nodes as necessary. In addition, the nodes may be geographically dispersed to prevent a localized event from interrupting the operation of the cluster. Currently, the nodes make decisions on failover based on system load, static priorities, and user configured priorities.

Unfortunately, current failover decisions do not result in optimal selection of nodes. The nodes or clusters selected for failover may be remote from primary storage or have environmental conditions that are indicative of impending problems. For example, a first set of nodes may be local to a primary storage array and remote from a secondary storage array which is local to a second set of nodes. Current failovers techniques can result in request processing being transferred to one of the second set of nodes which are remote from the primary storage resulting in an undesirable increase in latency. In addition, the second set of nodes may be at a higher temperature thereby causing them to be shutdown and thus necessitating processing to be transferred again.

In a similar manner, current failover techniques may not result in optimal transfers of coordination functionality among nodes. For example, current techniques may assign a node identifier or ID to each node and select a master coordination node based on the lowest ID. Again, this can result in increased latency as master coordination is transferred to a node that may be remote from the primary storage.

In addition, current failover selection techniques may select a group of failover nodes based on the size of the cluster in an effort to favor the larger cluster with more nodes. However, this can result in the less than optimal cluster selection. For example, where a node is failing in a two node cluster that is local to primary storage with a three node cluster that is remote from the primary storage, current techniques will select the three node cluster as a failover target. This results in increased latency because the three node cluster now handling requests is remote from the primary storage.

Thus, a need exists to make more intelligent selection in the failover of clusters to avoid increasing latency, thereby causing delays, and avoiding selection of systems in less environmentally desirable conditions.

SUMMARY OF THE INVENTION

Accordingly, embodiments of the present invention provide systems and methods for making intelligent cluster management decisions based on locations and environmental conditions (e.g., temperature). Embodiments utilize wireless communication, e.g., dynamic radio frequency identification (RFID) based information, in enabling more intelligent failover selection.

In one embodiment, the present invention is implemented as a method including receiving environmental information (e.g., temperature) and location information using wireless technology and detecting an error condition. In one embodiment, the location information may include a variety of information including rack information of a server of the storage cluster and zone information of a server of the storage cluster. In one embodiment, the temperature information comprises real-time ambient temperature of the device. Error conditions may be a variety of conditions including a network link failure, an application fault, and a storage fault. The method further includes, in response to the error condition, selecting a failover target based on the environmental information and location information and transferring operations from a portion of a storage cluster to the failover target based on the selection process. In one embodiment, the method further includes shutting down a portion of the storage cluster based on temperature information and the location information. The failover target may be a variety of devices including a server local to a primary storage, another server of the storage cluster, a portion of a storage cluster, and another storage cluster. The wireless technology may include RFID devices.

In one embodiment, the present invention is implemented as a computer readable storage medium having stored thereon, computer executable instructions that, if executed by a computer system cause the computer system to perform a method including receiving environmental information, e.g., temperature, and location information using wireless technology and detecting an error condition. The wireless technology may comprise a variety of devices including a rack RFID sensor. The method further includes, in response to the error condition, selecting a failover target based on the environmental and location information. In one embodiment, the selecting is further based on the proximity of a server to a storage array. The selection of the failover target may be based on a variety of information including the current ambient temperature of a failover target being lower than the ambient temperature of a server with an error condition. In one embodiment, the selection process includes selecting a master node. The method further includes transferring operations from a portion of a storage cluster to the failover target based on the selection result. In one embodiment, the storage cluster is a campus cluster.

In yet another embodiment, the present invention is implemented as a storage cluster system comprising a computer system having a processor coupled to a computer readable storage media and executing computer readable code which causes the computer system to implement a process including: receiving environmental information and location information using wireless technology and detecting an error condition. In one embodiment, the wireless technology may comprise a zone RFID sensor. The environmental information may comprise an ambient temperature for each location within the location information. The implemented process further includes, responsive to the failover event, selecting a failover target based on the temperature and location information. The selection may further be based on the proximity of a server to a storage array. The executing of computer readable code further causes the computer system to transfer operations from a portion of a storage cluster to the failover target based on the selection. In one embodiment, the storage cluster spans two geographical locations.

DETAILED DESCRIPTION

Reference will now be made in detail to embodiments of the claimed subject matter, examples of which are illustrated in the accompanying drawings. While the invention will be described in conjunction with embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Figure 1:
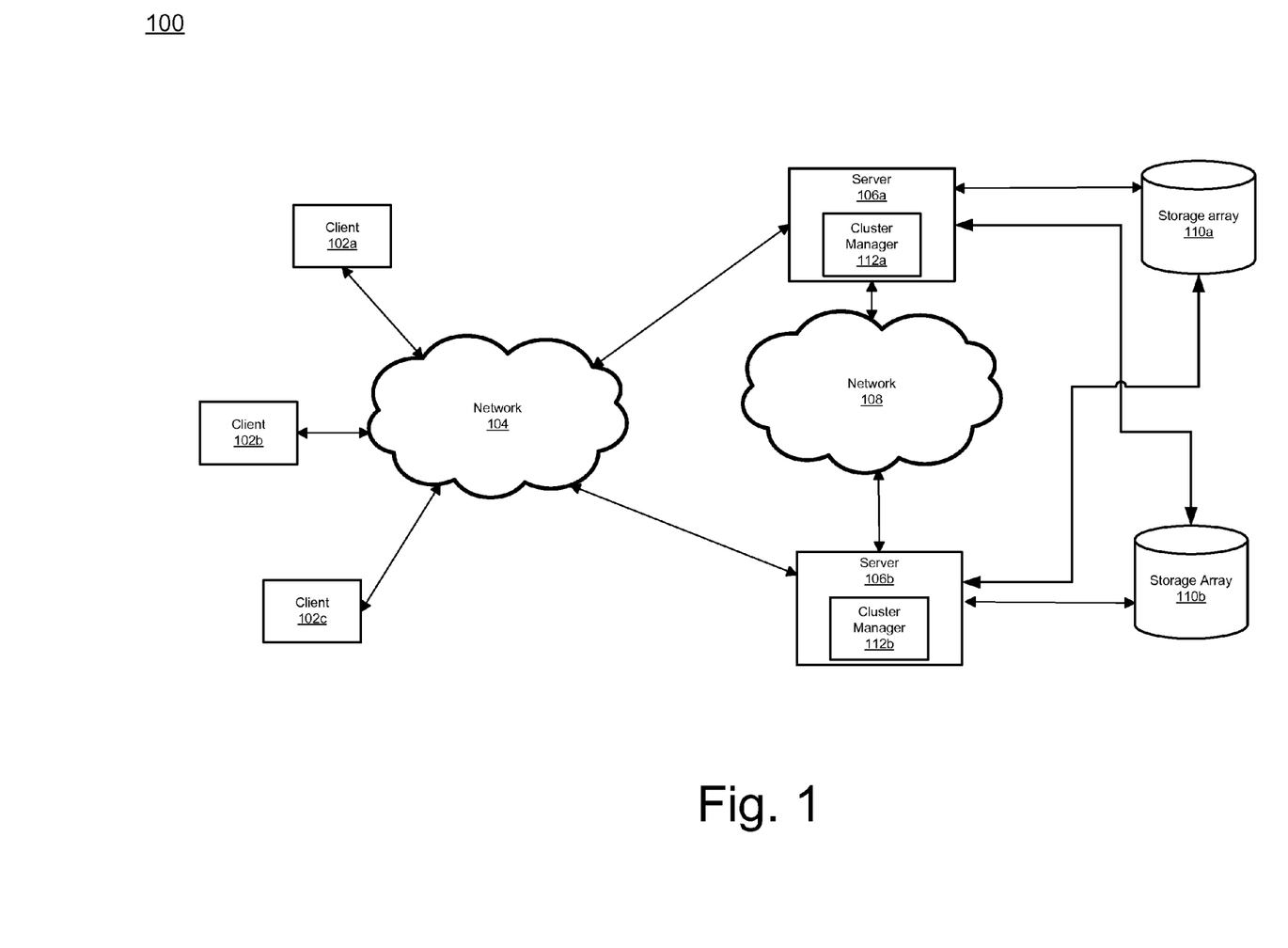
FIG. 1 shows a block diagram of an exemplary operating environment, in accordance with one embodiment of the present invention.

FIG. 1 shows a block diagram of an exemplary operating environment, in accordance with one embodiment of the present invention. Exemplary operating environment 100 includes clients 102a-c, networks 104 and 108, servers 106a-b, and storage arrays 110a-b. It is appreciated that that components of exemplary operating environment 100 are exemplary and more or fewer components may be present in various configurations.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b communicate with each other over network 108. In one embodiment, network 108 is a redundant private network. Servers 106a-b may be linked to storage arrays 110a-b in a variety of ways including, but not limited to, fibre channel.

Servers 106a-b respectively execute cluster managers 112a-b which intelligently handle failover decisions between servers (e.g., servers 106a-b) based on location and temperature information in accordance with embodiments of the present invention. More specifically, cluster managers 112a-b may use dynamic environmental, location, and dependency information in making intelligent cluster arbitration decisions. In accordance with embodiments of the present invention, some of this information may be wirelessly obtained. For example, server 106a may be in one location while server 106b resides in another location and cluster managers 112a-b may make decisions on which of servers 106a-b should handle processing functions in response to an error condition. As another example, cluster managers 112a-b may make failover decisions based on the current environmental conditions of a data center and rack to trigger a failover for instance upon a temperature rising above a prescribed threshold. In addition, cluster managers 112a-b may make decisions about group failover (e.g. for groups of servers), server arbitration, and master server selection upon encountering error conditions.

Figure 2:
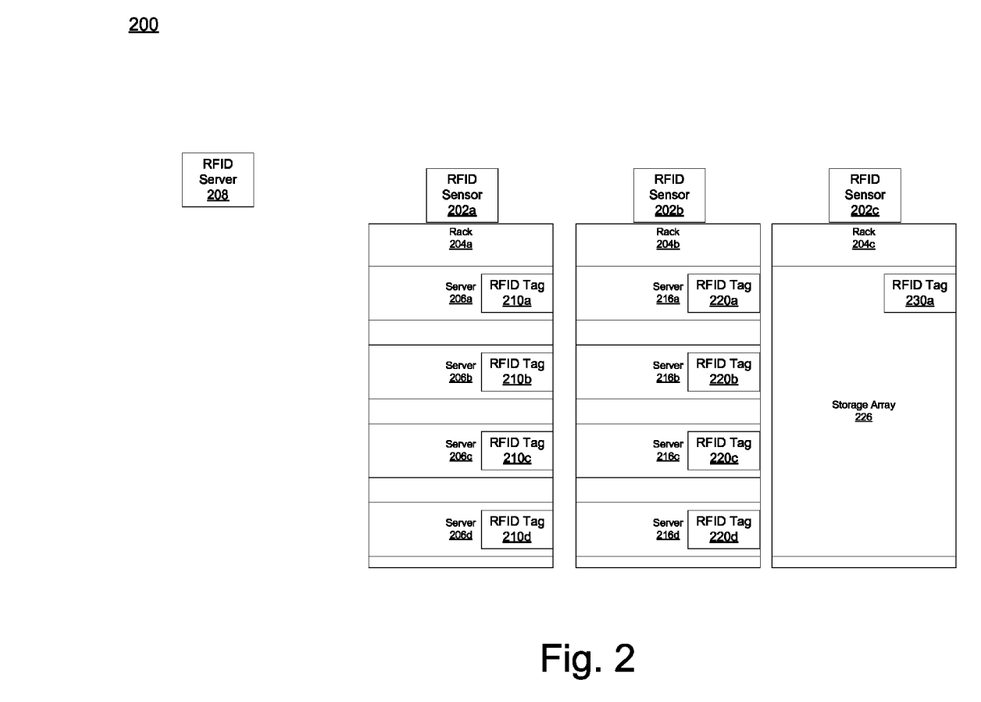
FIG. 2 shows a block diagram of another exemplary operating environment, in accordance with one embodiment of the present invention.

FIG. 2 shows a block diagram of another exemplary operating environment, in accordance with one embodiment of the present invention. Exemplary operating environment 200 includes racks 204a-c, radio-frequency identification (RFID) sensors 202a-c, and RFID server 208. Racks 204a-c have servers 206a-d, 216a-d, and storage array 226.

Information from wireless technology, e.g., RFID technology, can be used in a data center for assets management for tracking server and storage at different levels within a data center (e.g., zonal—for distributed assets within buildings, rack level—for assets within a data center, room level, etc.). RFID technology further allows tracking of assets which can move within a data center and between data centers. RFID technology further allows automatic updates of information without administrative support. By leveraging RFID technology to sense where servers and storage are located, embodiments of the present invention can provide advantageously intelligent algorithms for arbitration instead of relying solely on user configured policies and static information.

Servers 206a-d and 216a-d handle requests from clients (e.g., clients 102a-c) and provide access to storage (e.g., storage array 226). Servers 206a-d, 216a-d, and storage array 226 have RFID tags 210a-d, 220a-d, and 230a respectively. RFID tags 210a-d, 220a-d, and 230a allow for identification and proximity sensing by RFID sensors 202a-c. RFID sensors 202a-c provide information including current temperature information and present location information to RFID server 208. For example, RFID sensor 202a may provide information that servers 206a-d are located in rack 204a (via the proximity of RFID tags 210a-d). In one embodiment, RFID server 208 receives information from RFID sensor 202a in the form of "Tag ID XYZ Rack A" where XYZ is the ID of RFID Tag 210a and rack 204a is rack A. It is appreciated that RFID server 208 may optionally be located in one of racks 204a-c. If a server and attached tag are moved, the RFID tag can be tracked based from where it communicates (e.g., the rack where the server now resides).

In some embodiments, RFID sensors 202a-c may comprise temperature sensors operable to measure the ambient temperature and transmit the real-time temperature information to RFID server 208. The placement of RFID temperature sensors on a per rack basis allows collection of information as to whether the servers in the rack are heating up or cooling down. In one embodiment, RFID tags on devices (e.g., servers 206a-d and 216a-d and storage array 226) may have temperature sensors.

RFID Tags 210a-d, 220a-d, and 230a may be active and passive RFID tags. Passive RFID tags provide information when an attached device (e.g., server) is powered on. Active RFID tags may have a battery and provide information even if the device is powered off.

Figure 3:
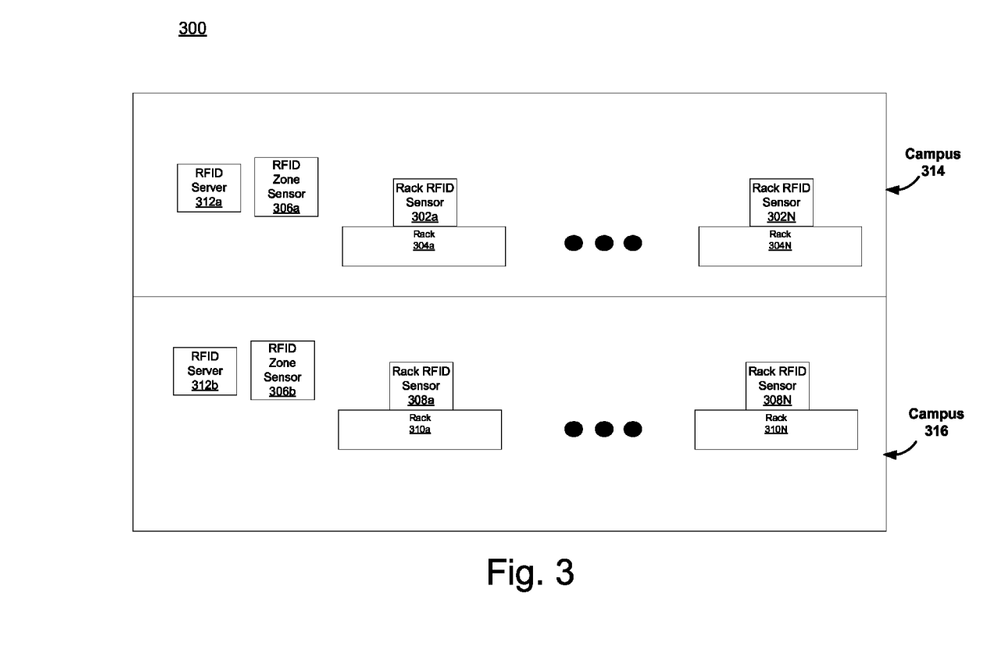
FIG. 3 shows a block diagram of an exemplary campus cluster operating environment, in accordance with one embodiment of the present invention.

FIG. 3 shows a block diagram of an exemplary campus cluster operating environment, in accordance with one embodiment of the present invention. Exemplary campus cluster operating environment includes campuses 314 and 316 which include RFID servers 312a-b, RFID zone sensors 306a-b, rack RFID sensors 302a-N, rack RFID sensors 308a-N, racks 304a-N, and racks 310a-N. It is appreciated that each campus may have any number (N) of racks of servers and storage arrays and rack RFID servers.

Rack RFID sensors 302a-N and 308a-N provide information on devices (e.g., servers 206a-d, 216a-d, and storage array 226) in racks 304a-N and racks 310a-N, respectively. RFID zone sensors 306a-b provides zone information based on the RFID tags of computing systems (e.g., servers devices in racks 304a-N and 310a-N).

In one embodiment, each rack (e.g., racks 304a-N and racks 310a-N) may be associated with a zone. Zone information may also provide location information based on servers or racks being known to be located in certain locations (e.g., campus 314 or 316). For example, RFID server 312a-b may provide information in the format of "TAG xyz is located in RACK 1 in Zone Z1". Zone sensors 306a-b may also provide the real-time ambient temperature of the zone.

RFID zone sensors 306a-b may allow storage to be associated with a zone via an RFID tag (e.g., RFID Tag 230). RFID zone sensor 306a-b may thus provide information of the location relative to the servers and racks which can be used to infer the locations of primary and secondary storage. This information can be used by a cluster manager for example for making intelligent failover decisions in accordance with embodiments of the present invention.

It is appreciated that RFID servers 312a-b provide dynamic updates as devices are moved (e.g., servers 206a-b, 216a-b, and storage array 226). For example, if a server is moved from campus 314 to campus 316, the server still has the same RFID Tag and configuration but will now be detected by the rack RFID sensor and RFID zone of campus 316. In accordance with embodiments described herein, the updated information as a result of a movement may be used for making intelligent failover decisions (e.g., cluster manager).

Figure 4:
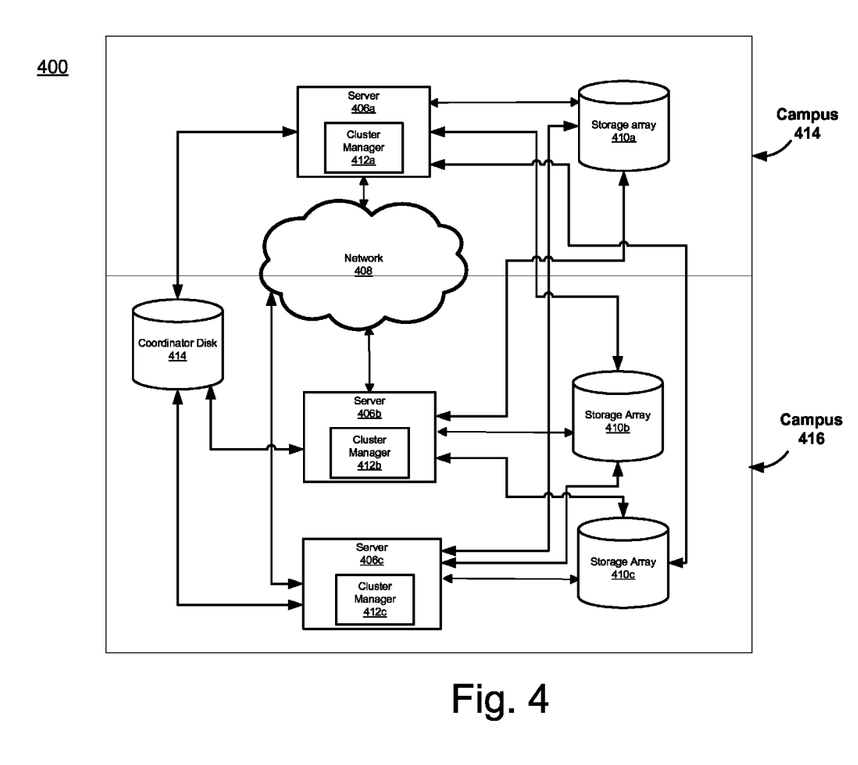
FIG. 4 shows a block diagram of an exemplary campus cluster, in accordance with one embodiment of the present invention.

FIG. 4 shows a block diagram of an exemplary campus cluster, in accordance with one embodiment of the present invention. Exemplary campus cluster includes campuses 414 and 416. Campuses 414 and 416 may be located in two geographically disparate locations. In one embodiment, campus 414 and 416 are in separate, relatively proximate buildings.

Campus 414 includes server 406a and storage array 410a. Network 408 communicatively couples servers 406a-c. In one embodiment, network 408 is a redundant private network. Server 406a is also communicatively coupled to storage arrays 410a-c and to coordinator disk 414. Campus 416 includes servers 406b-c, storage arrays 410b-c, and coordinator disk 414. Servers 406b-c are communicatively coupled via network 408 and are also communicatively coupled to storage arrays 410a-c.

Servers 406a-c include cluster managers 412a-c which make intelligent cluster management decisions for failover of processing functionality among servers 406a-c. More specifically, in accordance with embodiments of the present invention, cluster managers 412a-c make use of location and temperature information in determining which servers to failover to among servers 406a-c. For example, cluster managers 412a-c may consider a plurality of factors in a failover selection including the location and ambient temperature of each server, the location and ambient temperature of each storage array, storage/server dependency of each server, and the proximity of the storage to the array in a campus cluster environment. It is appreciated that the temperature and location information may be used in tandem with existing information or policies to make a more robust target selection algorithm.

Embodiments support primary or secondary configuration of the storage at each campus. The primary and secondary status means that data is written locally (primary) and periodically mirrored out to the secondary storage. In the case of failure of the primary storage, data can be restored from the secondary storage. In one embodiment, campus clusters often have servers writing to one particular primary storage.

In one embodiment, cluster managers 412a-c support write shipping where if a server does not have connectivity to storage (e.g., storage arrays 410a-c), the server sends the data across the network (e.g., network 408) to have another server perform the writing. It is appreciated that there may be a latency associated with data writing from a remote server to a primary storage if it is not at the same geographic location.

In one embodiment, cluster managers 412a-c support application failover from one server or node to another. A failure at a component level (e.g., a database process keeps dumping and dying, there is a faulty network interface card (NIC) card, an IP address intentionally being unconfigured), may cause an application failure which would be detected by cluster managers 412a-c and failover the application to another server based on location and temperature information. For example, if server 406b is running a database application and if the database application is faulting, operations may be transferred to servers 406c based on the proximity of server 406b to 406c. Proximity is detected based on the reported location information of the individual servers.

In another embodiment, cluster managers 412a-c support shutting down servers or nodes upon error conditions. Cluster managers 412a-c may support shutting down a server based on a reported ambient temperature. For example, if the temperature is climbing at campus 414, cluster managers 412a-c may transfer operations from server 406a to servers 406b-c and shutdown server 406a to prevent damage from over heating. The temperature information may be from the described RFID sensors (e.g., rack RFID sensor 302a or RFID zone sensor 306a).

Cluster managers 412a-c further support shutting down servers based upon network partitions. In one embodiment, cluster managers 412a-c have a membership module and a fencing module for handling error conditions including, but not limited to, network partitions (e.g., network link failure or a network switch failure). It is appreciated that embodiments may use membership functionality alone or in combination with fencing functionality in a failover selection. A network partition prevents some of the servers from communicating with each other meaning that the servers cannot cooperate or coordinate management of locks on storage arrays 410a-c. Accordingly, embodiments will shut down a server or servers in an effort to prevent data corruption. It is appreciated that other error conditions may necessitate shutting down of a server.

In one embodiment, membership modules are used with shared storage in an active/passive configuration. It is appreciated that the membership modules of cluster managers 412a-c may operate in other configurations. For example, servers 406b-c may be active servers while server 406a may be a passive server with shared storage of storage arrays 410b-c. Upon the loss of connectivity over network 408 of server 406a with servers 406b-c, the membership modules of each of cluster managers 412a-c detect that each of the other servers have faulted. Passive server 406a will now become active which results in an active/active configuration without lock protection to the shared storage of storage arrays 410a-c. The membership modules will now shut down a server to prevent data corruption. In the example, the membership modules will shut down 406a to prevent data corruption based on the proximity of serves 406b-c to shared storage of storage arrays 410b-c.

In another embodiment, when a fencing module of cluster managers 412a-c are used, coordinator disk 414 is used to determine which server to shutdown along with locality and temperature information in accordance with embodiments of the present invention. It is appreciated that coordinator disk 414 may include multiple coordinator disks (e.g., 3 logical unit numbers (LUNs)). With an active/passive configuration, coordinator disk 414 could have 3 logical unit numbers (LUNs) acting as coordinator disks and each of servers 406a-c to register keys (e.g., similar to small computer system interface (SCSI) 3 keys) in each of the LUNs. Coordinator disk 414 may be used by fencing module of cluster managers 412a-c to determine which server should be shutdown based on which server(s) first can eject the keys from the coordinator disk 414 along with location and temperature information.

Referring to the example above, fencing module selects server 406a for shutdown based on the proximity of servers 406b-c to storage arrays 410b-c or based on server 406a having a higher ambient temperature than servers 406b-c. In some embodiments, the fencing module of cluster managers 412a-c may determine a server to shutdown before a membership module determines a server to shutdown.

Fencing modules of cluster managers 412a-c also support parallel group configurations. For example, if each of servers 406a-c are in active parallel configurations a failure of server 406a or a detected temperature of server 406a above a threshold will result in server 406a being shutdown and servers 406b-c will takeover handling requests.

Cluster managers 412a-c further support intelligent failover decisions when storage fails. For example, within a configuration of storage arrays 410a-b and servers 406a-b operating in parallel, if storage array 410a fails and there is a loss of connectivity between servers 406a-b, then the membership and fencing modules will select to shutdown server 406a based on the closer proximity of server 406b to operating storage 410b. The proximity of server 406b to storage 410b is automatically detectable via RFID technology (e.g., RFID tags 210a-d, 220a-d, and 230a).

Figure 5:
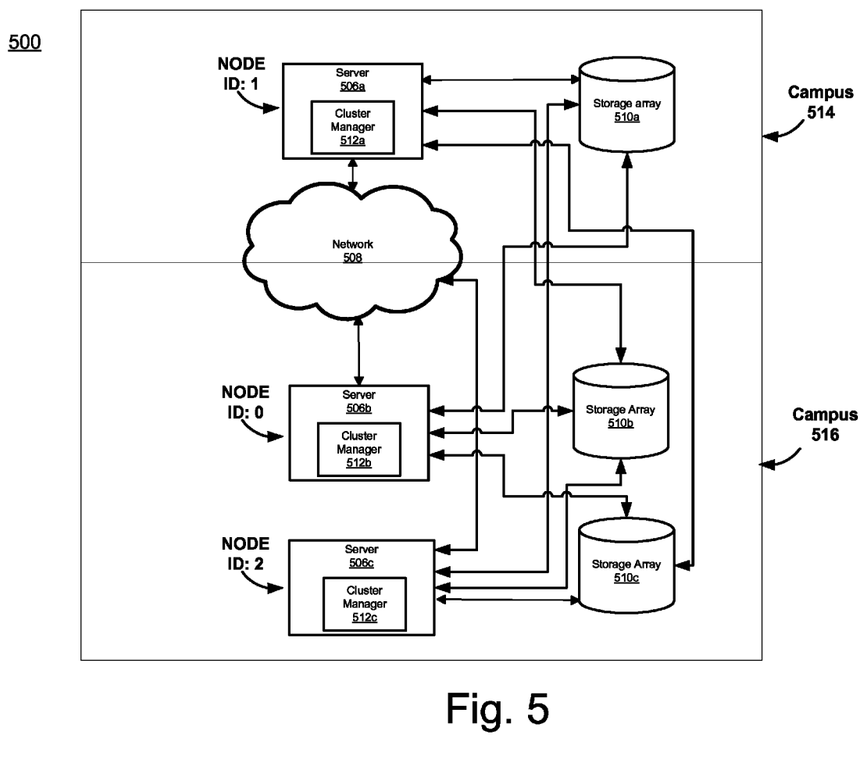
FIG. 5 shows a block diagram of an exemplary master node configuration, in accordance with one embodiment of the present invention.

FIG. 5 shows a block diagram of an exemplary master node configuration, in accordance with one embodiment of the present invention. Exemplary campus cluster includes campuses 514 and 516. In one embodiment, campus 514 and 516 may be located in separate, relatively proximate buildings.

Campus 514 includes server 506a and storage array 510a. Network 508 communicatively couples servers 506a-c in accordance with embodiments. In one embodiment, network 508 is a redundant private network. Server 506a is also communicatively coupled to storage arrays 510a-c and coordinator disk 514. Campus 516 includes servers 506b-c and storage arrays 510b-c. Servers 506b-c are communicatively coupled via network 508 and are also communicatively coupled to storage arrays 510a-c.

Servers 506a-c include cluster managers 512a-c which make intelligent cluster management decisions for failover of master node functionality among servers 506a-c in accordance with embodiments of the present invention. More specifically, cluster managers 512a-c make use of location and temperature information in determining which servers to failover master functionality to among servers 506a-c. For example, cluster managers 512a-c may consider a plurality of factors including the location and ambient temperature of each server, the location and ambient temperature of each storage array, storage/server dependency of each server, and the proximity of the storage to the array in a campus cluster environment. In one embodiment, each of servers 506a-c have access to a primary and secondary storage and vice versa.

In one embodiment, membership modules of cluster managers 512a-c are responsible for coordination of messages (e.g., lock coordination, heartbeat, etc.) between servers 506a-c. Membership modules of cluster managers 512a-c assign nodes identifiers (ID) to each of server 506a-c. Server 506a is assigned a node identifier (ID) of 0. Server 506b is assigned a node ID of 1 and server 506c is assigned a node ID of 2. More specifically, the membership modules guarantee that each server gets messages in order in the cluster without having to resend message or manage the ordering of the messages. Membership modules of cluster managers 512a-c select a master node or server to coordinate delivery of the messages among servers 506a-c. The master node performs the underlying coordination and sequencing to ensure that the correct sequence numbers are being granted and recover if a node leaves or joins the cluster.

Conventional methods choose lowest node ID as master when there is an event requiring failover. For example, conventional methods would select server 506a if server 506b were to go down, which would be undesirable as server 506a is remote from primary storage arrays 510b-c.

Advantageously, the membership modules of cluster managers 512a-c in accordance with embodiments of the present invention use location based information and storage information to select next master upon an error condition. Cluster managers 512a-c make decisions in an effort to keep the master node on one zone which is connected to the primary storage. It is appreciated that having the failover master node proximate to the current master reduces latency as the master node functionality is transferred. In one embodiment, location information reflecting that servers 506b-c are both in campus 516 would be used in selecting a failover target, and therefore a failover selection selects server 506c on the basis of being local to server 506b. In another embodiment, if the reported ambient temperature of server 506c is higher than the ambient temperature of server 506a, then server 506a may be selected as the failover target as the higher ambient temperature of sever 506c may indicate that a thermal problem is impending which, for example, could require the shutdown of server 506c.

Figure 6:
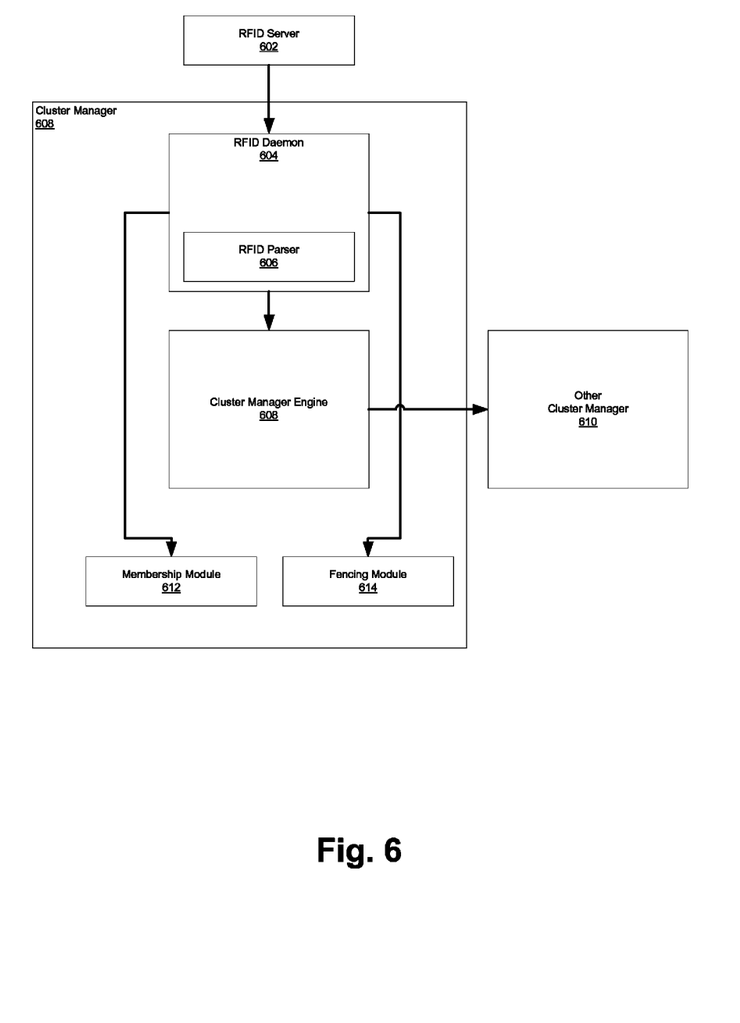
FIG. 6 shows an exemplary data flow diagram, in accordance with another embodiment of the present invention.

FIG. 6 shows an exemplary data flow diagram, in accordance with another embodiment of the present invention. RFID server 602 provides location information (e.g., rack and zone) and temperature information based on wireless communication technology, e.g., RFID tags (e.g., RFID Tags 210a-d, 220a-d, and 230a, RFID sensors 202a-c and RFID zone sensors 306a-b).

RFID server 602 provides information to RFID daemon 604 of cluster manager 603. In one embodiment, RFID server 602 provides a web services application programming interface (API) to receive updated values of RFID Tags and RFID sensors. Exemplary output from a sensor may be of the type "TAG xyz has a temperature of 30 C." At startup, each RFID server obtains the RFID information and anytime a tag dynamically changes or temperature changes value then there is a call back into RFID daemon 604 and the latest information is provided to RFID daemon 604.

Figure 7:
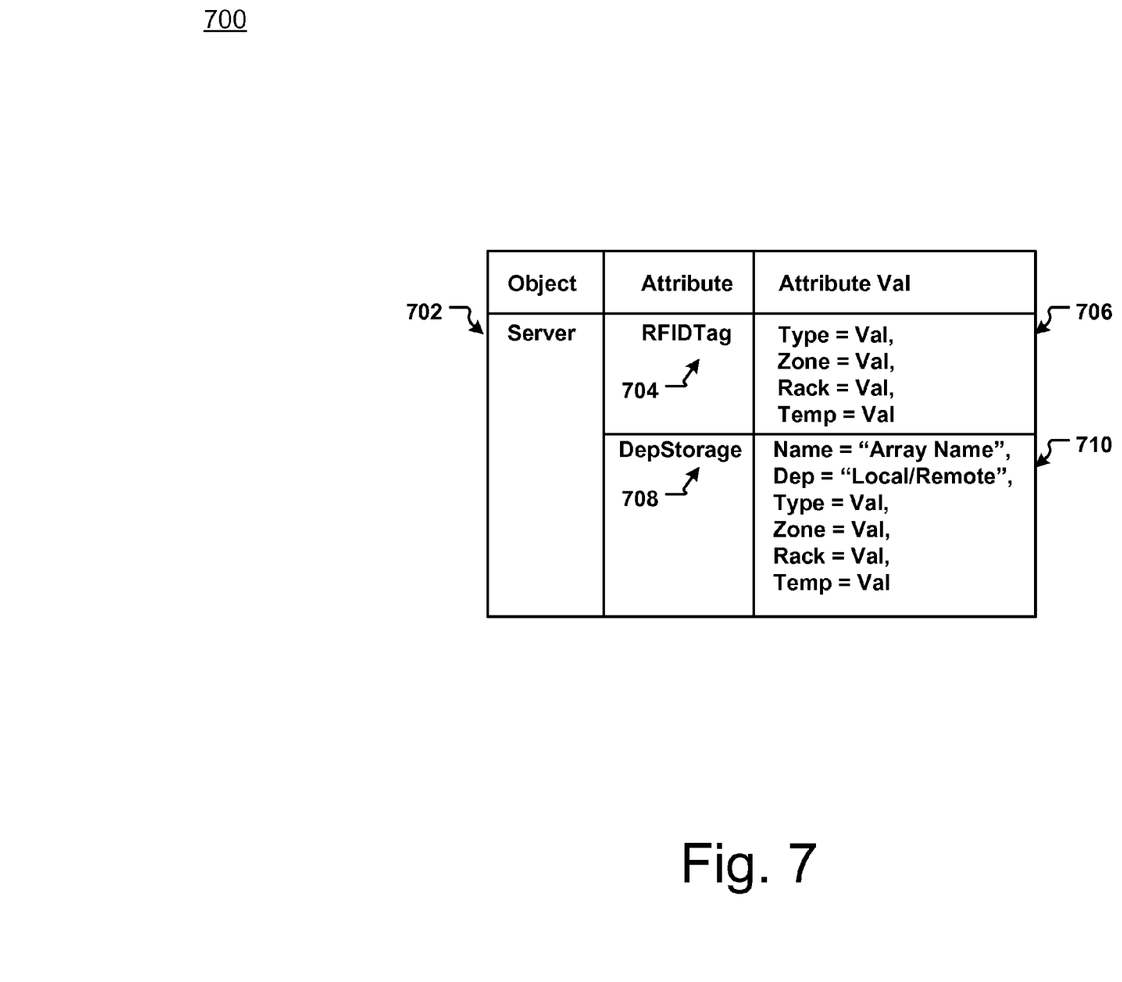
FIG. 7 shows a diagram of an exemplary data structure, in accordance with one embodiment of the present invention.

RFID Parser 606 receives updates from RFID server 602 received via the sensor tags. RFID parser 606 provides the updates to cluster manager engine 608, membership module 612, and fencing module 614. In one embodiment, RFID parser 606 interfaces with membership module 612, and fencing module 614 via an input/output control (ioctl) interface. Each of cluster manager engine 608, membership module 612, and fencing module 614 have internal data structures (e.g., data structure 700) for storing the received information. Embodiments thus allow objects to be enhanced with RFID tag information (e.g., data structure 700) that can be automatically and wireless communicated.

Further, RFID daemon 604 is able to determine movement of resources (e.g., servers and storage arrays) based on RFID Parser 606 and forward the determined information. For example, movement from campus to campus (e.g., campus 514 to 516) is detected based on a current location of a server being picked up in another campus (e.g., campus 516).

Cluster manager engine 608 receives location information and environmental information from RFID parser 606. In one embodiment, cluster manager engine 608 provides an input/output control (ioctl) interface to allow periodically update of the values by RFID parser 606 whenever there is a change. Cluster manager engine 608 provides a mechanism to manage persistent information in the form of attributes. The attributes for each tag contain details about the tag id and its current values (e.g., data structure 700).

In one embodiment, cluster manager engine 608 is application aware and able to make determinations of failover targets in response to error conditions, as described herein. In one embodiment, cluster manager engine 608 includes different agents that monitor a variety of cluster resources including, but not limited to applications, NFS mount points, IP addresses, and NICs.

Cluster manager engine 608 provides received location information and temperature information to other cluster manager 610 (e.g., cluster managers of other servers) thereby allowing each server in a cluster to obtain and manage up-to-date location information and temperature information. In one embodiment, location and temperature information are kept persistent and replicated across the cluster using a built-in replicated state machine infrastructure.

Membership module 612 determines failover targets, as described herein, based on the temperature and location information from RFID Tags and RFID sensors. Fencing module 614 determines failover targets, as described herein, based on the temperature and location information from RFID Tags and RFID sensors. Thus, in accordance with embodiments of the present invention, cluster manager engine 608, membership module 612, and fencing module 614 leverage the dynamically updated information from RFID technology to select failover targets.

FIG. 7 shows a diagram of an exemplary memory resident data structure, in accordance with one embodiment of the present invention. Exemplary data structure 700 includes server object 702 which includes attributes RFIDTag 704 and DepStorage 708. It is appreciated that exemplary data structure 700 reflects exemplary objects, attributes, and attribute values each of which may be used with more or less objects, attributes, or information. Data structure 700 allows the storing of: location and ambient temperature of each node; location and ambient temperature of each storage array; storage-server dependency information of each server; and the proximity of the storage to the server (e.g., in a campus cluster environment). Exemplary data structure 700 may be used by cluster manager engine, membership modules, and fencing modules to store the information from RFID technology.

RFIDTag 704 has attributes values 706 which in some embodiments include a type attribute, a zone attribute, a rack attribute, and a temperature attribute. DepStorage 708 has attribute values 710, which in some embodiments, include a name attribute, a dep attribute, a type attribute, a zone attribute, a rack attribute, and a temperature attribute. Type attributes correspond to the type of server (e.g., operating system).

Zone values correspond to the zones that the RFIDTag for a server may be located (e.g., RFID Tags 210a-d and 220a-d) and zones that storage may be located in (e.g., campus 414 and 416). It is appreciated that each zone may correspond to separate campuses or multiple zones may be present in a single campus. For example, multiple racks may be spread among multiple zones.

Rack values correspond to the rack in which an RFIDTag (e.g., RFID Tags 210a-d and 220a-d) is located and the rack in which the dependent storage is located, respectively. Temperature values correspond to the temperature associated with the servers having the RFID Tags (e.g., RFID Tags 210a-d and 220a-d) and RFID Tags associated with storage (e.g., RFID Tag 230a). In one embodiment, the temperature value may be the ambient temperature. In another embodiment, the temperature value may be the physical temperature of the system (e.g., server).

Figure 8:
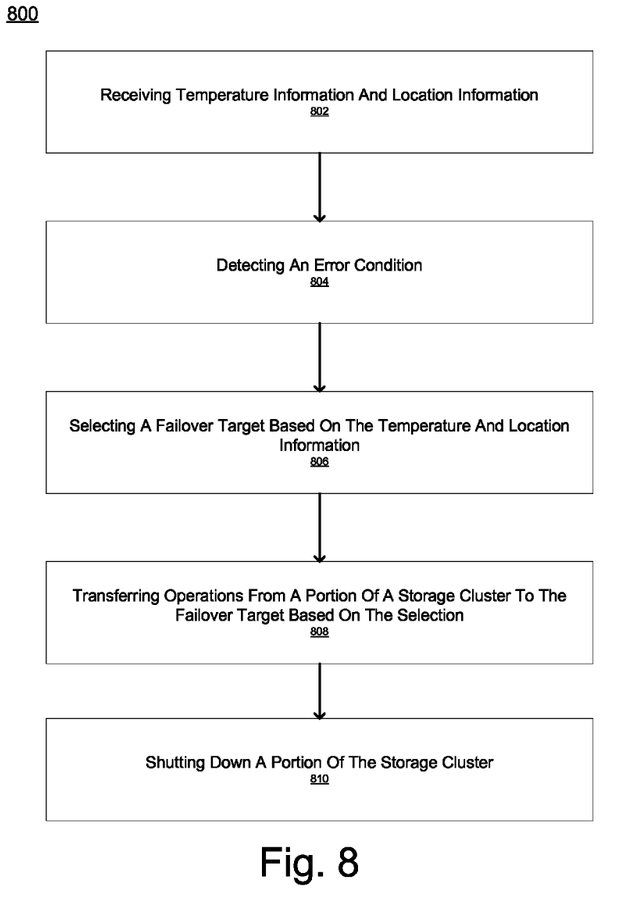
FIG. 8 shows an exemplary flowchart of a process for cluster management, in accordance with one embodiment of the present invention.
Figure 9:
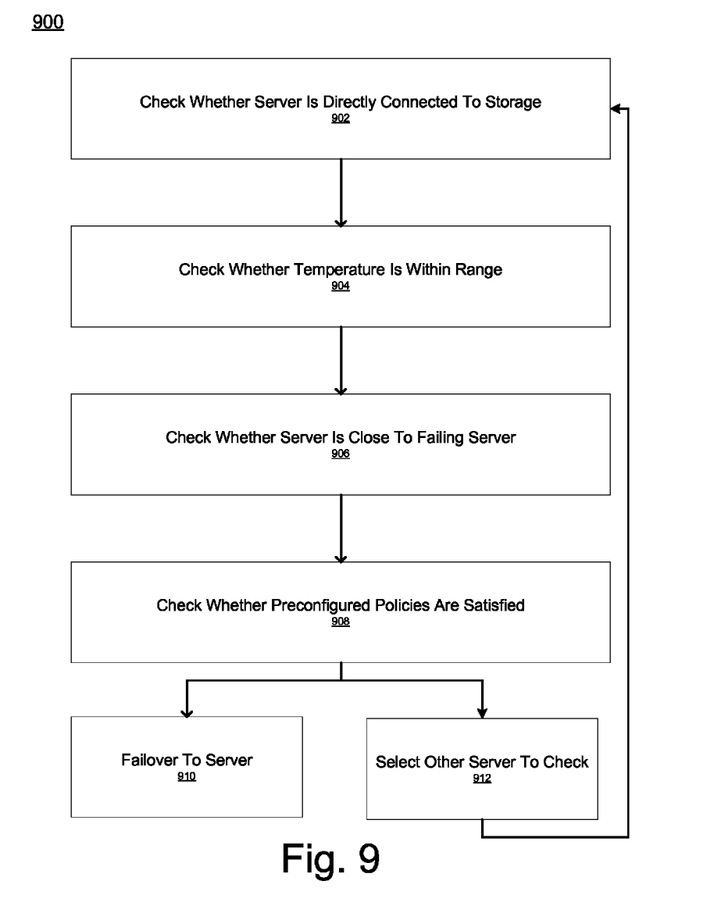
FIG. 9 shows an exemplary flowchart of a process for determining a failover target, in accordance with one embodiment of the present invention.

With reference to FIGS. 8 and 9, exemplary flowchart 800 and 900 illustrate example processes used by various embodiments of the present invention. Although specific blocks are disclosed in flowcharts 800 and 900, such blocks are exemplary. That is, embodiments are well suited to performing various other blocks or variations of the blocks recited in flowcharts 800 and 900. It is appreciated that the blocks in flowcharts 800 and 900 may be performed in an order different than presented, and that not all of the blocks in flowcharts 800 and 900 may be performed. Flowcharts 800 and 900 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

More specifically, FIG. 8 shows an exemplary flowchart of a process 800 for cluster management, in accordance with one embodiment of the present invention. Process 800 allows a cluster to intelligently failover operations upon an error condition and thereby provide high availability.

At block 802, temperature information and location information are received using wireless technology, e.g., RFID technology. The RFID technology may include a variety of devices including a zone RFID sensor and a rack RFID sensor. As described herein, the temperature information and location information may include a variety of information including location information comprising rack information, zone information, and ambient temperature.

At block 804, an error condition is detected. As described herein, embodiments may detect a variety of error conditions including network link failure, an application fault, and a storage fault.

At block 806, responsive to the error condition, a failover target based on the temperature and location information is automatically selected. As described herein, a failover target may be a variety of devices including a server local to a primary storage, another server of the storage cluster, a portion of a storage cluster, or another storage cluster. The selection of a failover target may be selected by a membership module, a fencing module, or a cluster manager engine. The selection of a failover target may also include selection of a master node. For example, the selection of the failover target may be based on an ambient temperature of a failover target being lower than a currently processing portion of the storage cluster.

At block 808, operations from a portion of a storage cluster are transferred to the failover target based on the selection of block 806. As described herein, the transfer of operations is performed to a portion of the storage cluster to have minimal impact and minimal change in performance (e.g., latency). In one embodiment, the storage cluster spans two geographical locations (e.g., a campus cluster).

At block 810, a portion of the storage cluster is shutdown based on the temperature information and the location information. As described herein, a portion of storage cluster may be shutdown for a variety of reasons including, but not limited to, environmental conditions (e.g., temperature) and network partitions.

FIG. 9 shows an exemplary flowchart of a process 900 for determining a failover target, in accordance with one embodiment of the present invention. In one embodiment, process 900 depicts the blocks in determining whether a server is a suitable failover target.

At block 902, the server is checked whether it is directly connected to the storage. As described herein, the server is checked to determine its proximity to the storage (e.g., primary storage) to ensure lower latency based on the information from the RFID technology. Proximity is determined based on reported location information from the wireless technology.

At block 904, the server is checked whether the temperature is within a suitable range. As described herein, the temperature (e.g., ambient temperature) information for the server is checked to determine if it is within a suitable range (e.g., not close to a threshold temperature that would require transferring operations from a server so that it may be shut down). Temperature is determined based on reported environmental conditions from the wireless technology.

At block 906, the server is checked whether the server is close to the failing server or server with an error condition. As described herein, the location of the server is compared with the location of the server with the error condition to ensure low latency in transferring operations from the server with the error condition.

At block 908, the server is checked whether any preconfigured policies are satisfied. Embodiments may also consider or weight additional factors in determining whether a server is a suitable failover target including preconfigured policies, cluster size, and node ID, etc. that are well known.

At block 910, the server is failed-over-to if each of the checks are satisfied. Based on conditions being satisfied, the server has operations transferred over, otherwise block 912 may be performed. It is appreciated that not all conditions may be satisfied but a threshold of conditions may be satisfied in selecting a server as a best or most suitable failover target. In one embodiment, when potential failover targets are similar or equidistant from a server with a detected error condition, the temperature of the potential failover targets may be used to select a failover target.

At block 912, another server is selected for checking based on the current server being an unsuitable failover target. Block 902 may then be performed for the newly selected server.

Figure 10:
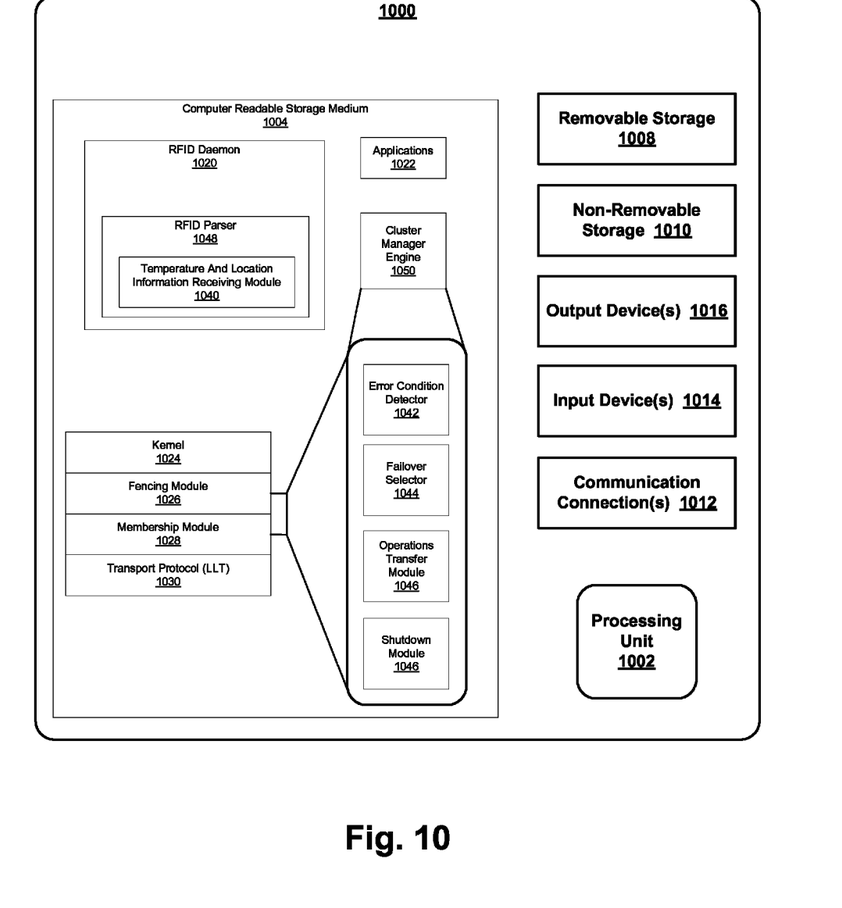
FIG. 10 shows a block diagram of an exemplary computer system, in accordance with one embodiment of the present invention.

FIG. 10 shows a block diagram of an exemplary computer system module 1000, in accordance with one embodiment of the present invention. With reference to FIG. 10, an exemplary system module for implementing embodiments includes a general purpose computing system environment, such as computing system environment 1000. Computing system environment 1000 may include, but is not limited to, servers, desktop computers, laptops, tablet PCs, mobile devices, and smartphones. In its most basic configuration, computing system environment 1000 typically includes at least one processing unit 1002 and computer readable storage medium 1004. Depending on the exact configuration and type of computing system environment, computer readable storage medium 1004 may be volatile (such as RAM), non-volatile (such as ROM, flash memory, etc.) or some combination of the two. Portions of computer readable storage medium 1004 when executed perform selection of failover targets (e.g., processes 800 and 900).

Additionally, computing system environment 1000 may also have additional features/functionality. For example, computing system environment 1000 may also include additional storage (removable and/or non-removable) including, but not limited to, magnetic or optical disks or tape. Such additional storage is illustrated in FIG. 10 by removable storage 1008 and non-removable storage 1010. Computer storage media includes volatile and nonvolatile, removable and non-removable media implemented in any method or technology for storage of information such as computer readable instructions, data structures, program modules or other data. Computer readable medium 1004, removable storage 1008 and nonremovable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1000. Any such computer storage media may be part of computing system environment 1000.

Computing system environment 1000 may also contain communications connection(s) 1012 that allow it to communicate with other devices. Communications connection(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1012 may allow computing system environment 1000 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1012 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1000 may also have input device(s) 1014 such as a keyboard, mouse, pen, voice input device, touch input device, remote control, etc. Output device (s) 1016 such as a display, speakers, etc. may also be included. All these devices are well known in the art and need not be discussed at length here.

In one embodiment, computer readable storage medium 1004 includes RFID daemon 1020, applications 1022, cluster manager engine 1050, kernel 1024, fencing module 1026, membership module 1028, and transport protocol 1030. Computer readable storage medium 1004 allows embodiments to use RFID based information of location, environmental conditions (e.g., temperature), and storage hierarchy to select a failover target intelligently. Applications 1022 may include a variety of applications operable to be used with a storage cluster including database servers, network file system (NFS) servers, and application servers (e.g., billing).

RFID daemon 1020 includes RFID parser 1048 which includes temperature location information receiving module 1040. As described herein, RFID parser 1048 receives information and updates from RFID technology (e.g., RFID servers) via temperature and location information receiving module 1040. RFID parser 1048 further provides information and updates to cluster manager engine 1050, fencing module 1026, and membership module 1028.

Kernel 1024 provides operating system functionality (e.g., providing a bridge between RFID Daemon 102, applications 1022, cluster manager engine 1050, fencing module 1026, membership module 1028, transport protocol 1030 and the resources of computer system 1000). Transport protocol 1030 facilitates communication of computer system 1000 via communication connection(s) 1012 (e.g., between servers and storage). In one embodiment, transport protocol 1030 is a low latency protocol that provides similar functionality to transfer control protocol (TCP).

Cluster manager engine 1050, fencing module 1026, and membership module 1028 each include respective versions of error condition detector 1042, failover selector 1044, operations transfer module 1046, and shutdown module 1048. Operations transfer module 1046 of each of cluster manager engine 1050, fencing module 1026, and membership module 1028 handle the transfer of operations between servers (e.g., transfer data associated with operations). Shutdown module 1046 of each of cluster manager engine 1050, fencing module 1026, and membership module 1028 shuts down servers based on servers where error conditions are detected.

Error condition detector 1042 of each of cluster manager engine 1050, fencing module 1026, and membership module 1028 detect error conditions which interfere with operations of a server or conditions that will soon interfere with operations of a server. Error condition detector 1042 of cluster manager engine 1050 detects a variety of error conditions including application failures or faults (e.g., applications 1022). Error condition detector 1042 of fencing module 1026 and error condition detector 1042 of membership module 1028 detects a variety of error conditions including, but not limited to, network partitions, temperature approaching thresholds, and storage failures. Failover selector 1044 of cluster manager engine 1050, fencing module 1026, and membership module 1028 select a failover target, as described herein, based on location and environmental conditions (e.g., temperature). In one embodiment, failover selector 1044 of fencing module 1026 use a coordinator disk (e.g., coordinator disk 414) along with temperature and location information in selecting a failover target.

For example, error condition detector 1042 of cluster manager engine 1050 may detect a database application failure at the application level then signal failover selector 1044 of cluster manager engine 1050. Failover selector 1044 of cluster manager engine 1050 will then select a failover target. And in response, operations transfer module 1050 and shutdown module 1046 will offline the resources of the current server, failover online the resources to another server, and bring the database application active on the new server.

Thus, embodiments of the present invention provide a method and system for making intelligent cluster management decisions based on device locations and environmental conditions (e.g., temperature) thereof. Embodiments utilize dynamic RFID technology based information in enabling intelligent failover target selection.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
   receiving temperature information and location information regarding a plurality of systems within a storage cluster using RFID technology;
   detecting an error condition within said storage cluster;
   responsive to said error condition, selecting a failover target based on said temperature and location information, wherein said selecting is further based on proximity of a server of said storage cluster to a storage array, and wherein said failover target is selected from a portion of said plurality of systems operable to function as said failover target based on a weighting of said temperature and location information; and
   transferring operations from a first portion of said storage cluster to said failover target based on said selection.

2. The method of claim 1 wherein said failover target is a first server of said storage cluster local to a primary storage.

3. The method of claim 1 wherein said failover target is a second server of said storage cluster.

4. The method of claim 1 wherein said failover target is a second portion of said storage cluster, and wherein said RFID technology comprises radio frequency identification (RFID) devices disposed with said failover target.

5. The method of claim 1 wherein said failover target is another storage cluster.

6. The method of claim 1 wherein said error condition is selected from the group consisting of a network link failure, an application fault and a storage fault.

7. The method of claim 1 further comprising:
shutting down a portion of said storage cluster based on said temperature information and said location information.

8. The method of claim 1, wherein said location information comprises rack information of a server of said storage cluster.

9. The method of claim 1, wherein said location information comprises zone information of a server of said storage cluster.

10. The method of claim 1, wherein said temperature information comprises an ambient temperature.

11. The method of claim 1, wherein said selecting of said failover target comprises selection of a remote server of said storage cluster when a first temperature of a local server of said storage cluster is higher than a second temperature of said remote server of said storage cluster.

12. The method of claim 1, wherein said failover target is selected based on satisfying a threshold of conditions.

13. A non-transitory computer readable storage medium having stored thereon, computer executable instructions that, if executed by a computer system cause said computer system to perform a method comprising:
receiving temperature information and location information regarding a plurality of systems within a storage cluster using RFID technology;
detecting an error condition within said storage cluster;
responsive to said error condition, selecting a failover target based on said temperature and location information, wherein said selecting is further based on proximity of a server of said storage cluster to a storage array, and wherein said failover target is selected from a portion of said plurality of systems operable to function as said failover target based on a weighting of said temperature and location information; and
transferring operations from a portion of said storage cluster to said failover target based on said selection.

14. The non-transitory computer readable storage medium of claim 13, wherein said storage cluster is a campus cluster.

15. The non-transitory computer readable storage medium of claim 13, wherein RFID technology comprises a plurality of rack RFID sensors associated with said systems.

16. The non-transitory computer readable storage medium of claim 13, wherein said selecting comprises selecting a master node.

17. The non-transitory computer readable storage medium of claim 13, wherein said selecting of said failover target is based on an ambient temperature of said failover target being lower than an ambient temperature of a server with said error condition.

18. A storage cluster system, comprising:
a plurality of server systems; and
a computer system comprising one or more processors coupled to a computer readable storage media and configurable to execute computer readable code stored on said computer readable storage media which causes said computer system to implement a method comprising:
receiving temperature information and location information concerning said server systems for a plurality of locations using RFID technology, wherein said temperature information comprises an ambient temperature for each location within said location information;
detecting an error condition of at least one of said server systems;
responsive to said error condition, selecting a failover target of said plurality of server systems based on said temperature and location information, wherein said selecting is further based on proximity of a server system to a storage array, and wherein said failover target is selected from a portion of said plurality of server systems operable to function as said failover target based on a weighting of said temperature and location information; and
transferring operations from a portion of said storage cluster system to said failover target based on said selection.

19. The storage cluster system of claim 18, wherein said plurality of server systems spans two geographical locations.

20. The storage cluster system of claim 18, wherein said RFID technology comprises zone RFID sensors associated with said server systems.

21. A method comprising:
receiving temperature information and location information regarding a plurality of electronic systems comprising a storage cluster, wherein said temperature and location information are received using wireless communication technology;
detecting an error condition within said storage cluster;
responsive to said error condition, selecting a failover target based on said temperature information and location information, wherein said failover target is selected from a portion of said plurality of electronics systems operable to function as said failover target based on a weighting of said temperature and location information; and
transferring operations from a first portion of said storage cluster to said failover target based on said selecting.

22. The method of claim 21 wherein said failover target is a first server local to a primary storage.

23. The method of claim 22 wherein said failover target is a second server of said storage cluster.

24. The method of claim 21 wherein said failover target is a second portion of said storage cluster, and wherein said wireless communication comprises radio frequency identification (RFID) devices disposed with said failover target.

25. The method of claim 21 wherein said failover target is another storage cluster.

26. The method of claim 21 wherein said error condition is selected from the group consisting of a network link failure, an application fault and a storage fault.

27. The method of claim 21 further comprising:
shutting down a portion of said storage cluster based on said temperature information and said location information.

28. The method of claim 21, wherein said location information comprises rack information of a server of said storage cluster.

29. The method of claim 21, wherein said location information comprises zone information of a server of said storage cluster.

30. The method of claim 21, wherein said temperature information comprises an ambient temperature.

* * * * *